Figure 1:
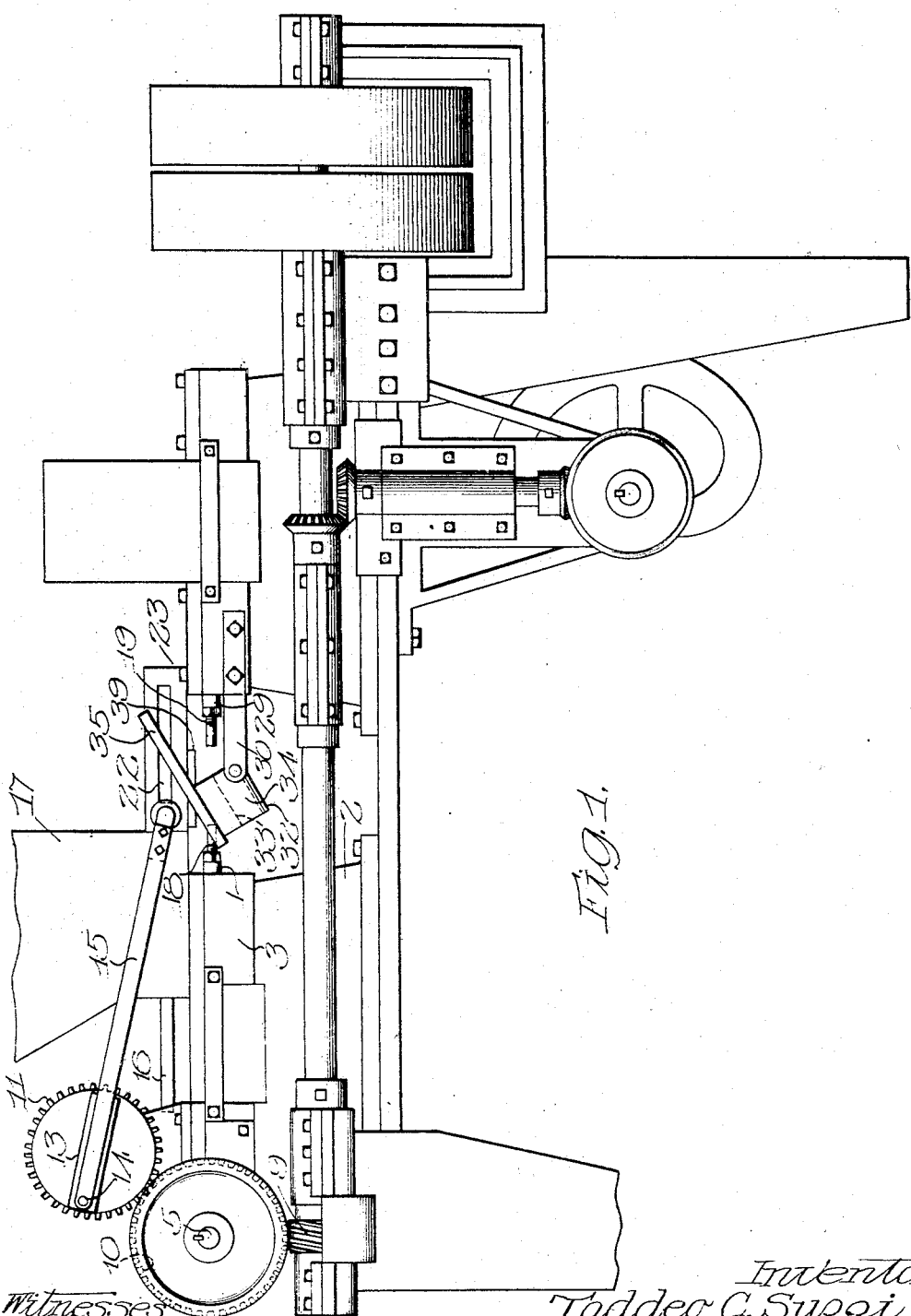

T. C. SUZZI.
FEED MECHANISM FOR NUT CRACKING MACHINES.
APPLICATION FILED NOV. 16, 1911.

1,038,229.

Patented Sept. 10, 1912.
4 SHEETS—SHEET 1.

Witnesses
G. W. Omarus Jr.
R. Burkhardt.

Inventor
Taddeo C. Suzzi
By Rudolph W. Lotz
Atty

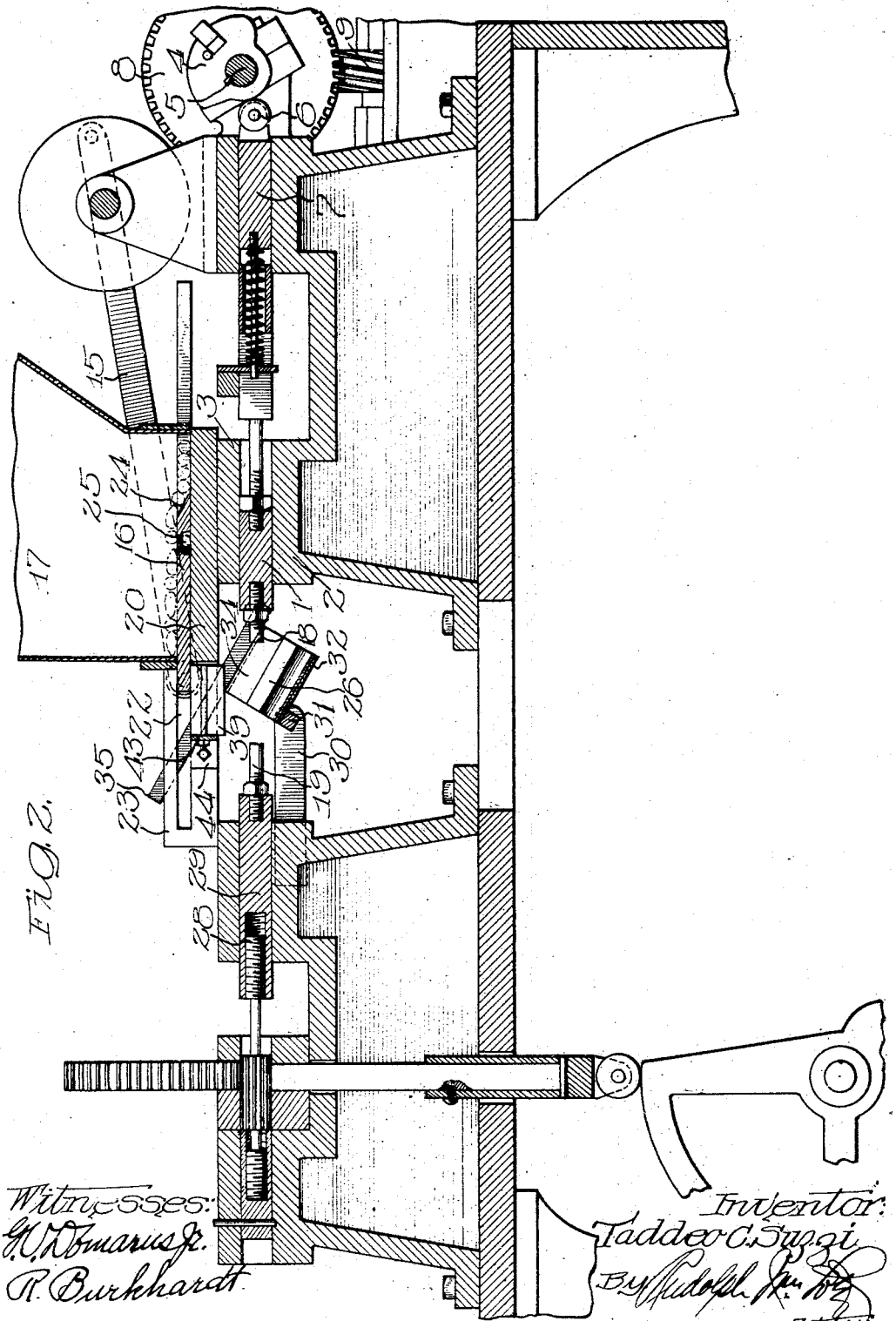

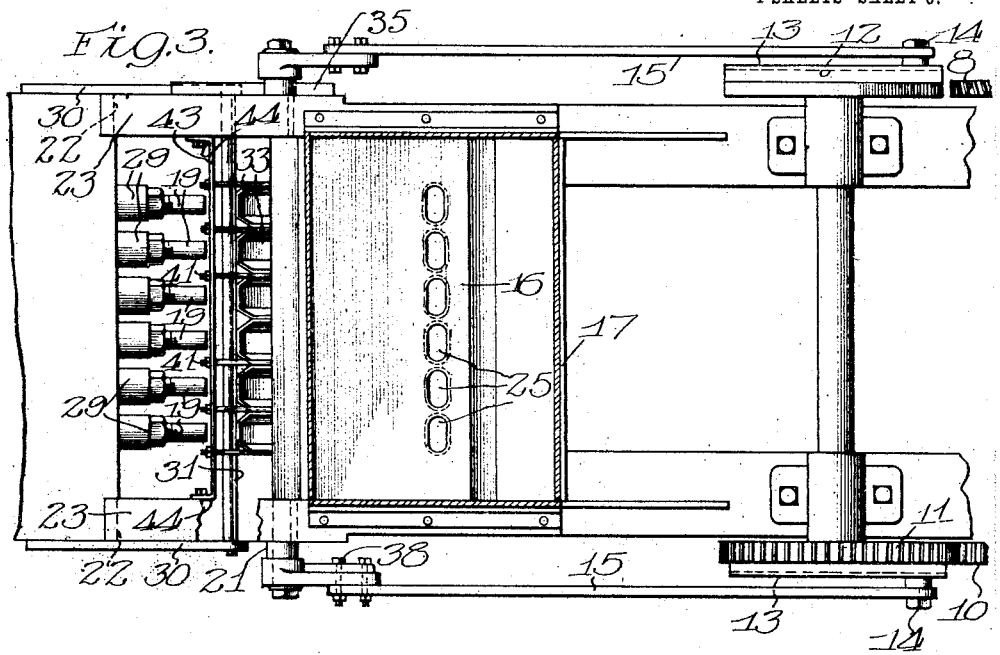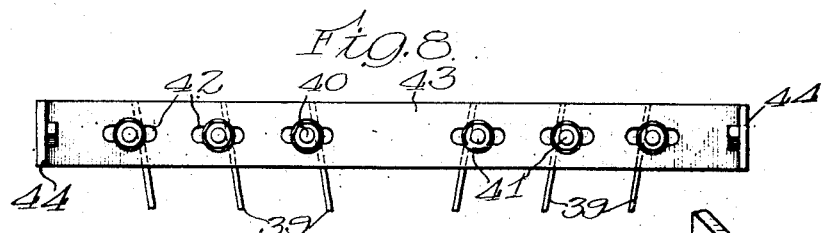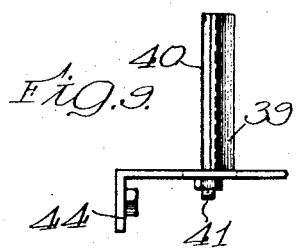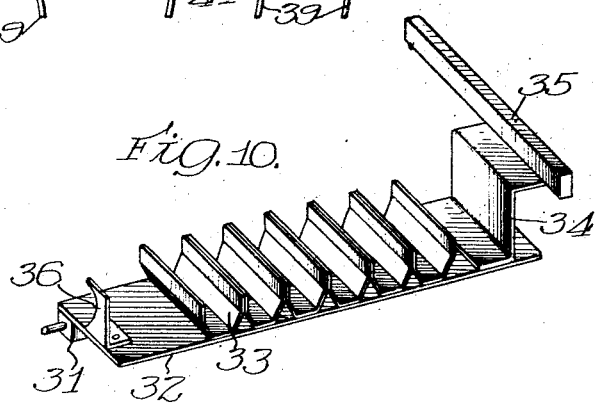

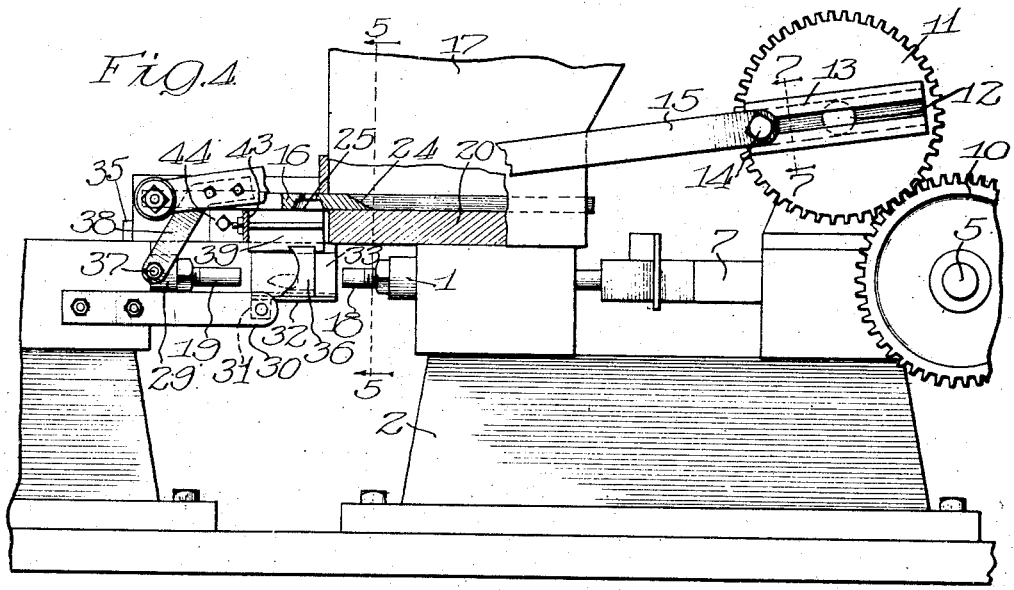

UNITED STATES PATENT OFFICE.

TADDEO C. SUZZI, OF CHICAGO, ILLINOIS.

FEED MECHANISM FOR NUT-CRACKING MACHINES.

1,038,229.     Specification of Letters Patent.     Patented Sept. 10, 1912.

Application filed November 16, 1911. Serial No. 660,624.

*To all whom it may concern:*

Be it known that I, TADDEO C. SUZZI, citizen of the United States, residing at Chicago, in the county of Cook and State of Illinois, have invented certain new and useful Improvements in Feed Mechanism for Nut-Cracking Machines; and I do hereby declare the following to be a full, clear, and exact description of the invention, such as will enable others skilled in the art to which it appertains to make and use the same.

This invention has for its object to provide new and useful improvements in nut cracking machines, and relates more particularly to feed mechanism for multiple plunger machines of the type shown and described in my application for Letters Patent Serial Number 553,336 filed April 4, 1910.

The invention consists in the features of construction and combinations of parts hereinafter fully described and particularly claimed.

In the accompanying drawings illustrating the invention: Figure —1— is a fragmentary side elevation of a nut cracking machine equipped with feeding mechanism embodying my invention. Fig. —2— is a central vertical longitudinal section of the same. Fig. —3— is a fragmentary top plan view of the same, the hopper for containing the nuts to be cracked being shown in horizontal section. Fig. —4— is a fragmentary detail view partly in section and partly in side elevation of feed mechanism constructed in accordance with my invention, parts of the nut cracking machine being included in the illustration. Fig. —5— is a fragmentary detail transverse section on the line 5—5 of Fig. —4—. Fig. —6— is a fragmentary detail vertical transverse section of the plunger employed for discharging the nuts from the hopper and delivering the same in the path of the cracking plungers. Fig. —7— is a fragmentary detail sectional view on the line 7—7 of Fig. —4— showing the adjustable crank connection between the pitmen actuating the nut carrying plunger and the gears and disks actuating said pitmen. Fig. —8— is a detail view in elevation of a bar employed showing the connection therewith of deflector plates for guiding the nuts from the carrying plunger into the pockets where they are supported in the path of the cracking plungers. Fig. —9—
is a fragmentary detail top plan view showing one end portion of the cross bar shown in Fig. —8— and the connection of one of said deflector plates therewith. Fig. —10— is a detail perspective view of the pocket-carrying plate for receiving and supporting the nuts in the path of the cracking plungers and discharging the same when cracked.

My invention has for its main object to provide substantially automatic feed mechanism for multiple plunger nut cracking machines which is very simple and efficient and will require substantially no attention and which, furthermore, will positively carry nuts to be cracked from the hopper into receptacles or pockets where the same are disposed in the path of the cracking plungers of the nut cracking machine.

The mechanism is adapted to be applied to the particular machine described and claimed in my aforesaid application, Serial No. 553,336 but may obviously be applied to other machines of a similar type, being capable of modification in construction to adapt the same to such other machines.

The invention consist in the particular combination of elements set forth in the appended claims.

The nut cracking machine partly illustrated in the accompanying drawings, and which is particularly adapted for cracking pecans, corresponds in all essential details with that shown and described in my aforesaid application Ser. No. 553,336, and consists of two sets of plungers, one of which is actuated by means of shafts having threaded engagement with the plungers on one side with a part of the frame of the machine, and which are rotated in one direction by rack bars engaging spur pinions on said shafts and which move by gravity to rotate said shafts to throw said plungers forward into engaging relation to the nuts to be cracked. The latter are engaged between the said rack-actuated plungers and a set of plungers carried by a reciprocating member on the other side which is moved at two different intervals by means of a cam to primarily throw the same forward a given distance simultaneously with the movement in the opposite direction of the first-named plungers to primarily engage the nut between said opposed plungers. A further movement is then given to the last-named set of plungers by means of said cam to throw the same farther forward a predetermined distance to crack the nuts after which all of said plungers of both sets are retracted.

As shown in the accompanying drawings, one set of said plungers is carried by a reciprocating plate 1 mounted in a guide formed between a table 2 and a plate 3 suitably mounted thereon. The said plate 1 is actuated by means of a cam 4 on a countershaft 5, said cam engaging the anti-friction roller 6 on a plunger 7. The movement of the latter is transmitted to the plate 1 by suitable means which require no particular explanation here.

The countershaft 5 is actuated by means of a worm wheel 8 thereon which meshes with the worm 9 disposed on a suitably driven shaft on the machine. Upon the other end of said shaft 5 there is mounted a spur gear 10 which meshes with the spur gear 11 mounted on a shaft 12. Said spur gear 11 is equipped with devices 13 of well-known construction with which a crank 14 is adjustably engaged, the latter being adapted through the intermediacy of a pitman 15 and a similar pitman actuated by a disk on the other end of the shaft 12, to impart reciprocatory motion to the plunger 16 which carries the nuts from a hopper 17 into receptacles which the cracking plungers 18 and 19 respectively, are adapted to enter from opposite ends. The hopper 17 is mounted upon the said plate 3. It has a flat bottom plate 20 over which the said plunger 16 moves, the latter moving through a slot in the front wall of said hopper. The said plunger 16 is connected at its forward end with the pitmen 15 on opposite sides of the machine, the trunnions 21 of said plunger moving in guide slots 22 in guide plates 23 suitably mounted upon the frame of the machine. The said plunger 16 is provided with a beveled inner end 24 which is adapted to pass underneath the mass of nuts contained in the hopper 17 when moving in one direction and which is provided adjacent said beveled end with a plurality of openings 25 in which the nuts to be cracked are received and are carried through the slot in the front wall of the hopper by said plunger and thereafter drop by gravity into receptacles 26 disposed underneath the portion of said plunger provided with said openings when the same reaches the forward limit of its movement. As shown in Fig. —3— the said openings 25 consist of transverse slots in said plunger 16 slightly longer than the usual length of pecan nuts found on the market, the said openings being, as shown more particularly in Fig. —6—, flared toward their lower or discharge ends so as to prevent nuts becoming wedged therein. The enlargement of said openings 25 is preferably accomplished by horizontally enlarging the same immediately below the upper face of the plunger 16 so as to leave a peripheral lip or flange 27 constituting the peripheral wall of each of said openings at its inlet end. Thus the points at the ends of the pecan nuts are given very little surface to engage and consequently there is very little likelihood or danger of a nut becoming lodged in one of said openings 25 so as to not readily drop from the same by gravity as the plunger reaches the forward limit of its movement at which time the said openings 25 pass beyond the forward end of the plate 20. The said plate 20 while reciprocating within the hopper 17 agitates the contents thereof and causes the nuts contained therein and disposed adjacent the bottom thereof to assume positions in which their longitudinal axes are disposed transversely to the directions of movement of said plunger 16 thus positioning them so as to cause one of same to drop into each of said openings as the latter pass into the hopper at each return stroke of said plunger.

Suitably mounted upon the table 28 carrying the guides for the plungers 29 carrying the anvil heads 19, against which the cracking heads 18 force the nuts during the cracking stroke thereof, are two bars or projections 30 in the free end portions of which the ends of the shaft or bar 31 carrying a plate 32 are journaled. The said plate 32 is equipped on its upper face midway between its ends with parallel pockets or receptacles 33 extending transversely thereof and parallel with the direction of movement of the cracking plungers and the plunger 16. The said pockets or receptacles 33 are provided with tapering or converging side walls contiguous to the bottoms thereof and by means of which the nuts are adapted to be centered therein and held in the path of the opposed ends of the cracking plungers to present their ends to oppose the opposing ends of the latter. The said plate 32 is adapted to be oscillated so as to tilt or cant at an angle after each cracking stroke of the plungers and after retraction of the latter so as to discharge the contents of the pockets or receptacles 33, this being accomplished as follows: On one end of said plate is a Z-shaped plate 34 secured to the plate 32 by one of its flanges, the other flange carrying a bar 35. The latter is adapted to be engaged by one of the trunnions of the plunger 16 and when so engaged is thrown to a position parallel with the horizontal plane in which said plunger 16 moves, the upper face of said bar being then disposed parallel with the lower wall of the slot 22 in one of the plates 23. The said bar 35 is of greater length than the width of said plate 32 and projects beyond the rear edge of the latter which is flush with one edge of the shaft or bar 31 carrying the same. The said projecting portion of the bar becomes disposed in the path of the trunnion adapted to engage the same when the plate 32 is canted into discharge position and is engaged thereby early in the forward stroke of the plunger 16 so that when the latter has attained a position substantially midway between its limits of movement, said plate 32 will be parallel with the said plunger 16 and will be maintained so during the balance of the forward stroke of said plunger 16 and until the latter has again reached a point substantially midway between the limits of its movement on its return stroke, after which said plate 32 will cant by gravity until it reaches the position shown in Fig. —2—. In the event, however, that said plate 32 should fail to become tilted or canted by gravity as the plunger 16 approaches the rearward limit of its movement, I have provided on the other end of said plate 32 a projection 36 which is disposed in the path of a lug 37 on the arm 38 of one of the pitmen 15, said lug being adapted as said plunger approaches the rearward limit of its movement to engage the said projection 36 and thus force the plate 32 into its tilted or canted position to discharge its contents. Between the upper ends of said pockets or receptacles 33 and the lower face of the plunger 16 there are disposed guide plates or deflectors 39, shown in detail in Fig. —8—. Each of the latter is mounted upon a rod 40 through a longitudinal slot 42 in a bar 43, the latter being equipped with flanges 44 by means of which it is bolted or otherwise secured to the said guide plates 23. Each of said threaded ends of said bolts or rods 40 is equipped with a nut by means of which the said bar 43 is firmly engaged thereby so as to hold said plates 39 in any desired position, said plates being thus adjustable on a horizontal axis and also laterally of the frame of the machine, as will be obvious. Said plates 39 are adjusted so as to bring their lower edges into vertical alinement with the upper edges of the side walls of the receptacles or pockets 33 and the upper edges of said plates 39 are disposed so as to lie in vertical alinement with the walls separating contiguous openings or pockets 25 in the plunger 16 from each other so that the nuts carried in said openings or pockets 25 will be delivered between two contiguous plates 39 and delivered by the latter into said respective pockets 33. The nuts will, in dropping and coming into contact with one or both of said plates 39 and with the side walls of said pockets or receptacles 33, be turned through an arc of substantially 90 degrees so as to extend longitudinally of said pockets or receptacles.

In operation the movements of the cracking plungers are timed relatively to the movements of the plunger 16 or vice versa so that immediately after the latter reaches the forward limit of its movement the cracking plungers move into the pockets or receptacles 33 to engage the contained nuts between the same. Then the final movement is imparted to the plungers 18 to crack the nuts and thereupon both sets of said plungers 18 and 19 are withdrawn from the pockets 33, this last movement being accomplished before or substantially at the same time that the plunger 16 reaches a point substantially midway between the limits of its movement. The plate 32 carrying the said pockets or receptacles begins to tilt before the nut cracking plungers make their cracking stroke and completes its tilting movement to discharge the contained cracked nuts substantially simultaneously with the completion of the inward stroke of the plunger 16 and, as the latter again moves forward carrying a fresh supply of nuts in the said openings or pockets 25, the said plate 32 is returned to its first position and receives the nuts as the plunger 16 reaches the forward limit of its movement. This operation is repeated at regular intervals as will be obvious.

Owing to the fact that the plunger 16 has a regular and continuous reciprocatory movement, and by reason of the shape of the pockets or openings 25 therein, the machine requires no other attention than to see that the hopper 17 is maintained well filled with nuts. Thus one person can attend to a very large number of said machines without inconvenience and the cracking of nuts is thus accomplished with great speed and economy.

The mechanism is also very simple, strong and durable besides being very efficient and is not liable to get out of order.

The machine to which the feed mechanism is herein shown to be applied is, as above stated, adapted for cracking pecan nuts and the plunger of the same, is, therefore, illustrated to adapt it to this particular type of nut. The cracking machine may, however, be adapted to walnuts, Brazil nuts, etc., and the feed mechanism will, in that event, be modified in certain particulars to adapt the same to the particular kind of nut to be fed.

I claim as my invention:

1. In a nut cracking machine, having opposed cracking plungers, and mechanism for actuating the same at regular intervals, a hopper for nuts to be cracked, a plunger having openings therein to receive nuts reciprocable in the bottom of said hopper and through a slot in one wall thereof, mechanism for reciprocating said plunger to alternately bring the openings therein into and out of said hopper, pockets open at their ends disposed to receive the ends of the opposed cracking plungers and disposed below and adapted to receive the nuts from said openings in said plunger as the latter reaches the forward limit of its movement, and means for rocking said pockets to cant the same after each cracking stroke of the cracking plungers to discharge the contents thereof.

2. In a nut cracking machine, having opposed cracking plungers, and mechanism for actuating the same at regular intervals, a hopper for nuts to be cracked, a plunger having openings therein to receive nuts reciprocable in the bottom of said hopper and through a slot in one wall thereof, mechanism for reciprocating said plunger to alternately bring the openings therein into and out of said hopper, a rocking member disposed below the cracking plungers and carrying pockets open at their ends and disposed to receive the ends of the cracking plungers and adapted to receive the nuts from said plunger as the latter reaches the forward limit of its movement, and means on said rocking member adapted to be actuated by the reciprocating nut feeding mechanism to impart rocking movement thereto in at least one direction.

3. In a nut cracking machine, having opposed cracking plungers, and mechanism for actuating the same at regular intervals, a hopper for nuts to be cracked, a plunger having openings therein to receive nuts reciprocable in the bottom of said hopper and through a slot in one wall thereof, mechanism for reciprocating said plunger to alternately bring the openings therein into and out of said hopper, a normally canted rocking member carrying pockets adapted to receive the nuts and support them in the path of the cracking plungers and adapted to be canted after each cracking stroke of said plungers to discharge their contents, and a bar carried by said rocking member and adapted to be engaged by a part of the feed plunger actuating means for turning the same to and maintaining it in horizontal position to receive and retain the nuts to be cracked until completion of the cracking stroke of the cracking plungers.

4. In a nut cracking machine, having opposed cracking plungers, and mechanism for actuating the same at regular intervals, a hopper for nuts to be cracked, a plunger having openings therein to receive nuts reciprocable in the bottom of said hopper and through a slot in one wall thereof, mechanism for reciprocating said plunger to alternately bring the openings therein into and out of said hopper, a normally canted rocking member carrying pockets adapted to receive the nuts and support them in the path of the cracking plungers and adapted to be canted after each cracking stroke to discharge their contents, and means carried by said rocking member and adapted to be engaged by a reciprocating part of the feed mechanism to turn the same to and maintain the same in horizontal position to receive and retain the nuts to be cracked until completion of the cracking stroke of the cracking plungers.

5. In a nut cracking machine, having opposed cracking plungers, and mechanism for actuating the same at regular intervals, a hopper for nuts to be cracked, a plunger having openings therein to receive nuts reciprocable in the bottom of said hopper and through a slot in one wall thereof, mechanism for reciprocating said plunger to alternately bring the openings therein into and out of said hopper, a normally canted rocking member carrying pockets adapted to receive the nuts and support them in the path of the cracking plungers and adapted to be canted after each cracking stroke to discharge their contents, and means carried by said rocking member and adapted to be engaged by reciprocating parts of the feed mechanism to alternately turn the same to horizontal and canted position respectively, at different intervals.

6. In a nut cracking machine, having opposed cracking plungers, and mechanism for actuating the same at regular intervals, a hopper for nuts to be cracked, a reciprocating carrier movable in the bottom of said hopper and through a slot in one wall thereof, said carrier provided between its ends with openings adapted to receive the nuts and carry the same from said hopper, said plunger having a beveled inner edge adapted to raise the nuts contained in said hopper during each inward stroke, whereby said nuts are caused to roll and present their longitudinal axes transversely to the direction of motion of said plunger, the openings in the latter resembling in shape the longitudinal sections of the nuts and disposed so that their longest diameters extend transversely to the direction of movement of said plunger.

7. In a nut cracking machine, having opposed cracking plungers, and mechanism for actuating the same at regular intervals, a hopper for nuts to be cracked, a reciprocating carrier movable in the bottom of said hopper and through a slot in one wall thereof, said carrier provided between its ends with openings adapted to receive the nuts and carry the same from said hopper, means for receiving said nuts and holding same in engaging relation to the cracking plungers, and adapted to cant to discharge the nuts between the intervals of actuation of the cracking plungers, and devices controlled by the carrier actuating mechanism for determining the position of said means.

In testimony whereof I have signed my name in presence of two subscribing witnesses.

TADDEO C. SUZZI.

Witnesses:
MAE M. BOYLE,
F. T. HIGLEY.